J. C. McKenzie.
Brick-Machine.
Nº 75287      Patented Mar. 10, 1868.
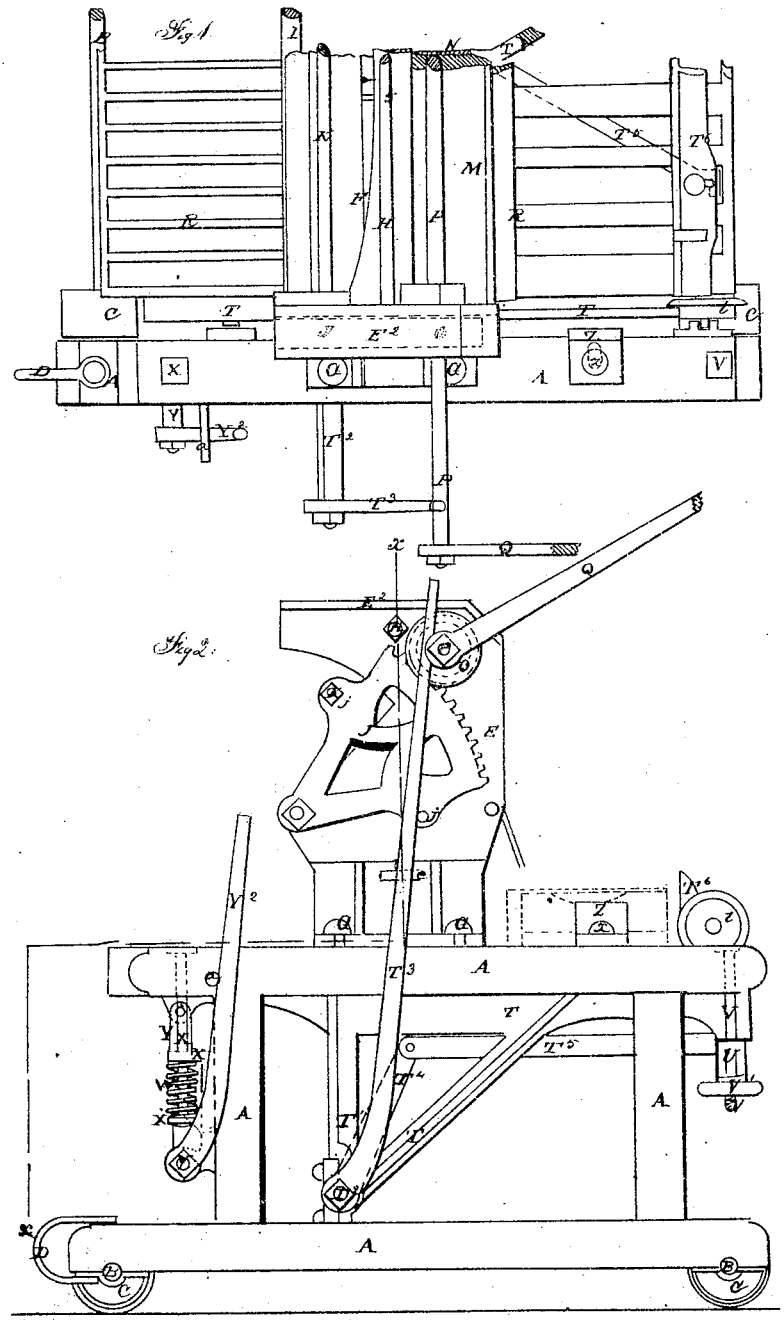

J. C. McKenzie.
Brick-Machine.
Nº 75287          Patented Mar. 10, 1868.
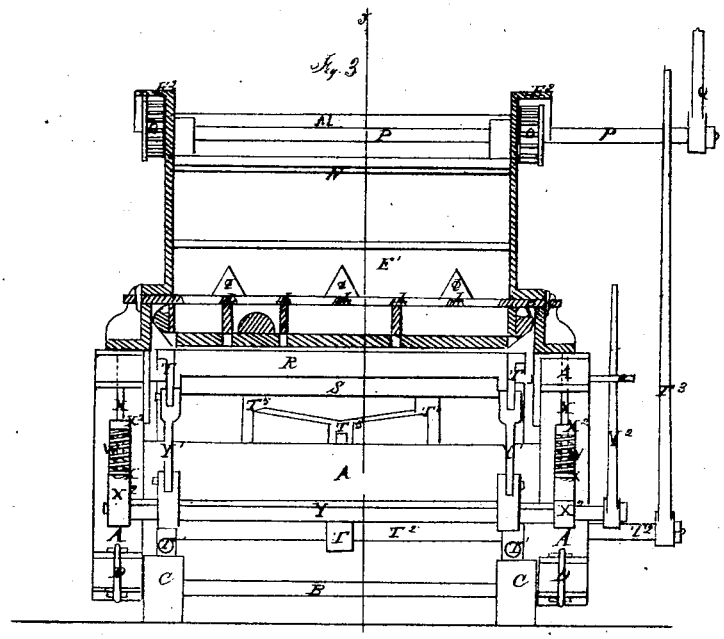
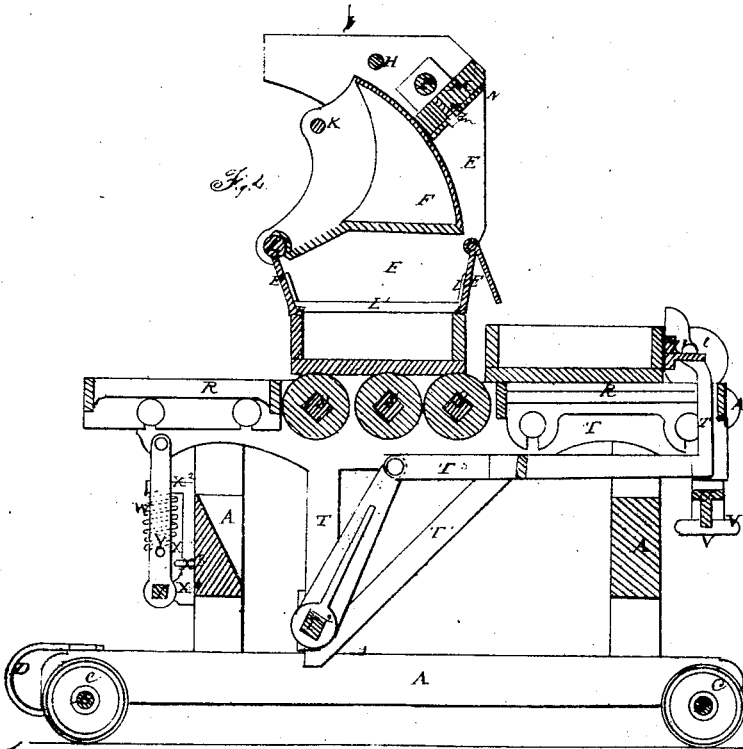

United States Patent Office.

J. C. McKENZIE, OF ADRIAN, MICHIGAN.

Letters Patent No. 75,287, dated March 10, 1868.

IMPROVED BRICK-MACHINE.

The Schedule referred to in these Letters Patent and making part of the same.

TO ALL WHOM IT MAY CONCERN:

Be it known that I, J. C. McKENZIE, of Adrian, in the county of Lenawee, and State of Michigan, have invented certain new and useful Improvements in Brick-Machines; and I do hereby declare the following to be a full, clear, and exact description of the same, reference being had to the accompanying drawings, which are made a part of this specification.

My invention relates to that class of brick-machines in which the clay is compressed in the moulds by a pivoted plunger or "press," operated by segmental racks and pinions, and the moulds rest on an adjustable rack, and are propelled under the press-box by a frame operated by crank and lever.

My improvements consist, first, in supporting one or both ends of the mould-rack on springs, so as to counteract the strain caused by stones or other incompressible substances getting into the moulds; second, in the provision of an adjustable scraper to remove any clay which may adhere to the face of the plunger; third, in making some or all of the bevelled bars in the bottom of the press-box removable, to allow of the pressing of different sizes and forms of bricks; and, fourth, in the construction of the segmental racks attached to the ends of the press or plunger, so as to allow of their reversal when worn. In the drawings—

Figure 1 is a partial plan view of a brick-machine embodying my improvements.

Figure 2 is a side elevation.

Figure 3 is a front elevation, partially in vertical section, on the line $x\ x$, fig. 2.

Figure 4 is a longitudinal section on the line $y\ y$, fig. 3.

A A may represent the frame of the machine, and B B shafts journalled transversely of said frame, having keyed to them wheels C C C C, on which the machine is supported. D D are clevises attached to the front of the frame, to provide for the attachment of animal or other power to draw the machine by.

E is the press-box, into which the clay is fed from the pug-mill, and from which it is forced into the moulds by the "press" or plunger F. The press-box E is fastened to the frame A by bolts G, which pass through slots in the bottom flanges of its ends, and is braced longitudinally by the rod H and shaft I, the latter of which also forms the pivot of the plunger F, and of the segmental racks J. These racks are further attached to said plunger by the rod K, which passes through both ends of said plunger, and through both of said racks, where it is threaded and secured by nuts. The lower portion of the box E, which forms the sides $E^1$, and bars L, is cast with slotted lugs $e$, which pass through slots in the ends of the box, where they are held by wedges or keys. The front edge of this bottom is bevelled at $e'$, to smooth the compressed clay in the moulds.

L' L' L' are bars of similar form to the stationary ones L, but held at one side by rigid projections or cleats, $l$, and on the other by buttons $l'$, so as to allow their removal to accommodate moulds for different forms of bricks for paving, &c., such as would be made in the mould shown in section in fig. 3, for instance.

M is a bar of wood or metal secured between the ends of the box E. N is an adjustable scraper attached to said bar M by screws $m$, passing through oblong slots $n$. This scraper removes from the face of the plunger F any clay which may adhere to it in the box E, the slots allowing it to be moved down when worn.

O O are pinions which mesh with and operate the segmental racks J, attached to the ends of the plunger F. These pinions are both keyed to the shaft P, which is rotated by the lever Q, or other suitable means. The gearing J O is protected by flanges $E^2$, formed on the ends of the box E.

The segmental racks J being cast with both sides equal, and of the same outline, and with two holes, $j$, for the passage of the rod or bolt K, by which they are attached to the plunger, may readily be taken off and changed or turned when worn, whereas otherwise they would have to be replaced with new ones.

The mould-rack is composed of two grates or frames, R, on which the mould rests before and after the bricks are compressed, and a series of rollers, S, on which it rests while under the press-box. The frames R are secured to the sides T by bolts, as shown in fig. 3, and the rollers S are journalled in said sides. The rear end of the mould-rack rests on a bar, U, extending across the machine, and adjustably supported from the projecting upper rear ends of the frame A, on bolts V, by nuts V', the rotation of which give the rack more or less slant, as desired. The front end is supported on springs, W, of any suitable form and material, (coiled steel or rubber being preferable.) These springs are strung on bolts, X, depending from the upper front ends of the frame A, and supported and regulated by nuts $X^1$. $X^2\ X^2$ are sliding hangers, which rest on said springs, and are guided by staples, $X^3$, to form bearings for the rock-shaft Y, to which the mould-rack is connected by toggles Y, said toggles being operated, to raise or lower the rack, by a lever, $Y^2$, keyed to the rock-shaft Y. $a$ is a pin projecting from the side of frame A, against which the lever $Y^2$ rests when the rack is in its raised position. The sides T of the mould-rack extending downward, form hangers, $T^1$, in which the rock-shaft $T^2$ is journalled. Keyed to this shaft is a lever, $T^3$, by which it is operated, and a crank, $T^4$, to which is attached a forked frame, $T^5$, connecting it with the mould-propelling carriage $T^6$, the wheels $t$ of which run on tracks formed by the flaring upper edge of the rear ends of the sides T of the mould-rack. The carriage $T^6$, where the frame $T^5$ is attached to it, is slotted, to allow it to be adjusted so as to carry the moulds the proper distance under the press-box.

Z is an adjustable stop and guide to arrest the moulds in a proper position to be forced into the opening under the press-box. It is secured to the frame by a bolt, $z'$, passing through an oblong slot, $z$, which allows the stop to be adjusted relatively to the opening under the press-box, to suit different lengths of moulds.

*Operation.*

The press-box being filled with clay from the pug-mill, the plunger in its raised position, the mould-rack adjusted to the proper height, and the stop Z set so as to guide the mould into the opening under the press-box, the empty mould is slid on to the mould-rack, as shown in figs. 2 and 4, until it is arrested by the stop Z. The carriage $T^6$ is then propelled forward by the lever $T^3$, bringing the mould under the press-box, when the carriage is forced back, and another mould slid on, as shown in fig. 4. The plunger F is then forced down by means of the lever Q, forcing the clay into the mould, the lever Q returned, and the lever $T^3$ again brought forward, bringing an empty mould under the press-box, and forcing the filled one out on to the front grate, from which it is removed by hand. By turning back the lever $Y^2$, and allowing the rack to drop, stones, &c., which may have gotten into the moulds with the clay, may be easily removed.

When it is desired to press larger bricks than those usually made, by turning the buttons $l'$ the bars $L'$ may be removed, when the machine is adapted to press bricks such as would be made in the mould represented under the press, in fig. 3, or by having all the bars removable, the grate may be regulated to press any desired forms of bricks, &c.

Having thus described my invention, what I claim as new, and desire to secure by Letters Patent, is—

1. The springs W, arranged and operating, in combination with the bolts X and sliding hangers $X^2$, to afford an elastic support for the mould-rack, substantially as and for the purpose described.

2. The scraper N, adjustable by means of slots $n$ and set-screws $m$, employed in combination with the pivoted plunger E, as and for the purpose specified.

3. Making some or all of the bars L L' removable, by means of the buttons $l'$ or their equivalents, substantially as and for the purpose set forth.

4. The segmental racks J $j$, constructed substantially as represented and described, so as to admit of their reversal when worn.

To the above specification of my improved brick-machine I have signed my hand, this 14th day of November, A. D. 1867.

J. C. McKENZIE.

Witnesses:
  Morton Eddy,
  O. M. Eddy.